UNITED STATES PATENT OFFICE.

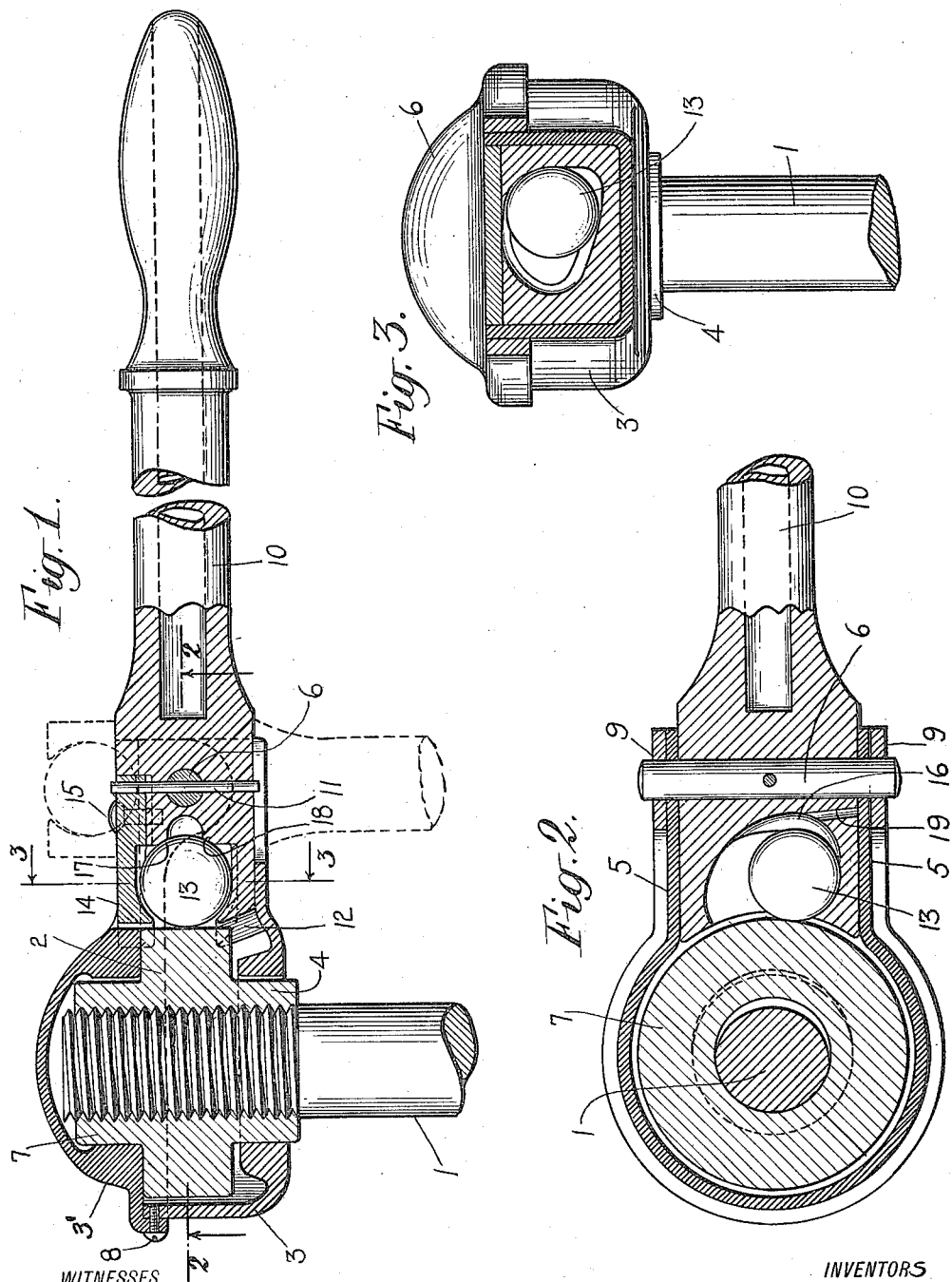

ERNEST ASHFORTH EVANS AND ARTHUR ULYSSES WILLING, OF MILWAUKEE, WISCONSIN, ASSIGNORS TO RATCHET BRAKE COMPANY, OF NEW YORK, N. Y., A CORPORATION OF DELAWARE.

BRAKE-HANDLE.

1,162,994.  Specification of Letters Patent.  Patented Dec. 7, 1915.

Application filed November 11, 1913.  Serial No. 800,382.

*To all whom it may concern:*

Be it known that we, ERNEST A. EVANS, a British subject, residing at Milwaukee, county of Milwaukee, and State of Wisconsin, and ARTHUR U. WILLING, a citizen of the United States, residing at Milwaukee, county of Milwaukee, and State of Wisconsin, have invented certain new and useful Improvements in Brake-Handles; and we do hereby declare the following to be a full, clear, and exact description of the invention, such as will enable others skilled in the art to which it appertains to make and use the same.

The present invention relates to hand actuated brake mechanism suitable for use on railway cars, street cars, and the like, and is of the kind in which forward and backward swings of the operating handle or lever are used to apply the brakes, the handle being effectively clutched to the brake staff during the forward or brake setting swing, and being unclutched therefrom on the return swing.

More particularly the invention is directed to a mechanism having a frictional driving connection between the handle and the brake staff, serviceable for driving the staff forward to set the brakes, but effectively releasing connection between the handle and the staff when the handle is being swung back for a new grip so that further advancement of the staff may be made by a second forward swing of the handle and the friction member carried thereby; and also this frictional connecting means and the operating handle are so related to the brake staff and its associated parts that when the handle is folded down or dropped from its active or horizontal position to a vertical position, the frictional connecting means will be wholly disconnected and the brake staff will be free to turn backward releasing the brakes as soon as the operator kicks out the usual retaining dog from its ratchet connection with the staff.

In the accompanying drawings, Figure 1 shows the top of a brake staff, and in vertical section illustrates the handle and the frictional connecting means between the handle and the staff; Fig. 2 is a horizontal section along the line 2—2 of Fig. 1; and Fig. 3 is a transverse vertical section along the line 3—3 of Fig. 1.

The brake staff 1 may be supported at any convenient place on a passenger car or freight car, or on a street car, or the like, being held in brackets or other suitable retaining means not shown, and its lower end being provided with the usual retaining ratchet engaging with a dog mounted, for instance, on a platform of the car. The staff carries a winding drum for the brake chain, or other usual mechanism for transferring to the brakes the power delivered through the staff when it is forcibly turned by the operator. The top end of the brake staff may be screw-threaded as shown, or otherwise suitably secured to a friction member 2 in the form of a hub having a smooth periphery and utilized as one element of the frictional connecting means for driving the brake staff when the brakes are to be set. A housing 3 incloses this friction member 2 and may be shaped as a bearing to receive a flange 4, with which hub 2 is provided on its lower face. One side of this housing 3 is extended outwardly in the form of a rectangular box and terminates in arms 5, through which extends a pivot pin 6, whereon the operating handle of the brake is mounted. Housing 3 is provided with a cover 3' shaped to inclose the upper portion of friction member 2 and bearing against the upper flange 7 thereof, this cover being suitably attached to housing 3 by means of screws 8, or the like, and extending outwardly over the rectangular extension of the housing and there terminating in downwardly extending ears 9 through which pivot pin 6 extends.

The operating handle 10 is pivotally mounted on pin 6 and may swing from its normal horizontal position into a vertical position, as indicated in dotted lines, Fig. 1. A retaining pin 11 passing through the handle and pivot pin 6 locks the pivot pin against longitudinal movement and guards against accidental disconnection at the joint. The forward end of the handle is shaped to fit the arc of the adjacent friction member 2 and is cut away at 12, Fig. 1, to give suitable clearance when the handle is swung to vertical position. Also, this end of the handle is provided with a recess or socket for the reception of a ball 13, which constitutes a second friction member and is effective for establishing frictional engagement with hub 2 to form in effect a friction clutch between handle 10 and brake staff 1, this clutch being of such character that on the forward swing of the handle effective driving connection will be established and the brake-staff will turn to set the brakes, but on the return swing of the handle the ball will release its driving engagement with the hub and permit the handle to swing back while the brake staff is being held against return movement by the usual ratchet and pawl positioned on the lower end of the staff. To effect this result, the socket wherein ball 13 is contained is of tapering cross-section, as shown in Fig. 2, to the end that when the ball is in the contracted portion of the socket it will be wedged tightly between the hub 2 and the opposite wall of the socket, but when the ball is in the larger portion of the recess, as shown in Fig. 2, there will be room enough between the hub and the wall of the socket to release the driving engagement with hub 2. Preferably, the top wall 14 of the ball socket is removably attached to the handle by means of screws 15 for the more ready introduction or removal of ball 13, and preferably the rear face of the pocket is cut away at 16 to leave two rounded projections 17 and 18 against which the ball may be forcibly pressed when in driving position against hub 2. From the lower portion of the recess 16 there is provided a duct 19 leading out through the side of the handle member so that any rain or foreign material which might enter the ball socket when the handle is in vertical position will drain off between the handle and arms 5, and so will not interfere with proper action of the device.

As a means for increasing the efficiency of the frictional connection between the handle and the frictional hub 2, the ball socket may have its bottom portion inclined as shown in Fig. 3, the result being that the ball tends always to roll forward into the contracted or gripping portion of the socket, and after each backward swing of the handle will immediately take up a gripping position at that end of the socket, so that frictional connection will be established with certainty and before any appreciable forward swing of the handle.

When the handle is dropped or folded down from its active horizontal position into vertical position, as shown in dotted lines, Fig. 1, the ball 13 will be swung around wholly out of engagement with frictional hub 2, thereby leaving the brake staff completely disconnected from the handle and free to turn within housing 3 and its cover 3′ as soon as the operator kicks out the retaining dog from the ratchet at the lower end of the staff. Hub 2 is so shaped that it turns freely in housing 3 and its cover 3′, and there is enough play between flanges 4 and 7 and the parts surrounding the same to permit freedom of rotation, while at the same time insuring a tight grip along these faces when ball 13 grips against the periphery of hub 2. In a certain sense it may be considered that the rotating moment applied to the shaft by the handle is applied not only between the ball 13 and the frictional hub 2, but also by housing 3 and its cover 3′, where they bear against the flanges 4 and 7 of hub 2. And when the handle is dropped to swing ball 13 away from the hub, the housing and its cover completely release their driving engagement with flanges 4 and 7 and leave the smooth hub member free and unrestrained in its rotary movement.

Various changes may be made in the details and character of the frictional connecting means which serves to establish the requisite driving connection between handle and staff without departing from the spirit of our invention as defined by the appended claims.

What we claim is:

1. The combination of a brake staff, a friction member mounted to turn therewith, a brake handle swinging about said staff in a horizontal plane and mounted to swing downwardly into vertical position, and a friction member carried by said handle for establishing a frictional driving connection between said handle and said staff to drive the staff forwardly to set the brakes when the handle is moved back and forth in its horizontal plane, said connection being wholly interrupted when the handle is dropped to vertical position.

2. The combination with a brake staff, a brake handle mounted to swing about said staff in a horizontal plane, a ball clutch establishing driving connection between said handle and said staff to turn the staff and set the brakes when the handle is moved back and forth in its horizontal plane, and means for separating the engaging portions of said clutch to render the clutch inactive when the brakes are to be released through reverse rotatory movement of said staff.

3. The combination of a brake staff, of a friction member mounted to turn therewith, a housing inclosing said friction member, a brake handle pivoted to said housing and adapted to swing from a horizontal to a vertical position, and a second friction member carried by said handle and adapted normally to drive the friction member of said staff but swinging upward into inactive position when the handle is dropped.

4. The combination with a brake staff, of a drop handle mounted thereon, and a friction clutch for operatively connecting said handle to said staff when the handle is in raised and active position, said clutch being automatically rendered inactive when the handle is dropped from its horizontal to its vertical position.

5. The combination with a brake staff, of a housing at the top thereof, a drop handle pivoted to said housing, a clutch member attached to the staff, and a second clutch member carried by said handle and movable by gravity into clutching relation with the clutch member of said staff.

6. The combination with a brake staff, of a drop handle mounted thereon, a clutch for operatively connecting said handle with said staff, said clutch comprising a member rigidly attached to said staff and a member mounted in said handle, said last named member being movable transversely of said handle, into and out of its clutching relation with the member on said staff.

7. The combination with a brake staff of a friction member mounted to turn therewith, a support in which said brake staff may turn, a brake handle pivoted to said support and adapted to swing from horizontal to vertical position, a rotating friction member mounted to swing with said handle, said friction member engaging with the friction member of said staff when the handle is in horizontal position, and moving out of engagement therewith when the handle is dropped to vertical position.

8. The combination with a brake staff, of a brake handle pivotally supported at the top of said staff, said handle being adapted to drop down into a vertical position, and a ball clutch operatively connecting said handle with said staff when the handle is in horizontal position, said clutch being rendered inactive through movement of one of its members when the handle is dropped to vertical position.

9. The combination with a brake staff, of a smooth friction member mounted to turn therewith, a brake handle mounted to swing about said staff and pivoted to drop into vertical position, and a friction member movable with said handle and adapted to grip the smooth friction member of said staff to establish driving connection between said handle and said staff when the handle is moved forward to set the brakes, but interrupting said connection when the handle is moved backward, the friction member of said handle moving wholly out of operative position with respect to the friction member of said staff when the handle is dropped to its vertical position.

10. The combination with a brake staff, of a friction member in the form of a hub mounted to turn with said staff, a housing inclosing said friction member, a brake handle pivoted to said housing and adapted to fold out of the way and a ball carried by said handle and movable to establish effective connection between said handle and said brake staff when the handle is moved forwardly to set the brakes, but effectively disconnecting the handle from the brake staff on the return swing of the handle.

11. The combination with a brake staff, a support mounted near the top of said staff, a brake handle pivoted to said support and adapted to drop downward into vertical position, and a ball clutch operatively connecting the handle with said staff when the handle is in horizontal position and causing said staff to turn when the brake handle is swung forwardly to set the brakes, said ball clutch releasing effective connection with the staff on the return swing of the handle, and one member of the ball clutch being mounted to swing out of effective engagement with the other when the brake handle is dropped from horizontal to vertical position.

12. The combination with a brake staff, of a friction member mounted thereon, a housing for said friction member, a brake handle pivoted to said housing and having a tapering socket in its end, and a rolling member in said socket positioned to grip the friction member of said staff when the handle is swung forwardly to set the brakes, said rolling member moving out of gripping relation on the return swing of the handle and moving wholly out of gripping relation when the handle is swung downward on its pivotal support.

13. The combination with a brake shaft, of a friction member thereon in the form of a hub, a housing for said friction member, a handle pivoted to said housing and adapted to drop from a horizontal to a vertical position, said handle having a tapering socket adjacent to said friction member, and a ball seated in said socket and movable into driving relation with said friction member when the handle is swung forwardly to set the brakes, and moving out of driving relation with said friction member on the return swing of the handle, said ball being moved upwardly away from said friction member when the handle is dropped to its vertical position.

In testimony whereof we affix our signatures, in presence of two witnesses.

ERNEST ASHFORTH EVANS.
ARTHUR ULYSSES WILLING.

Witnesses:
F. M. WIEDEMAN,
J. J. O'CONNOR.

It is hereby certified that in Letters Patent No. 1,162,994, granted December 7, 1915, upon the application of Ernest Ashforth Evans and Arthur Ulysses Willing, of Milwaukee, Wisconsin, for an improvement in "Brake-Handles," an error appears in the printed specification requiring correction as follows: Page 3, line 97, claim 13, for the word "shaft" read *staff;* and that the said Letters Patent should be read with this correction therein that the same may conform to the record of the case in the Patent Office.

Signed and sealed this 11th day of January, A. D., 1916.

[SEAL.]

Cl. 188—57.

J. T. NEWTON,
*Acting Commissioner of Patents.*